Patented Dec. 8, 1953

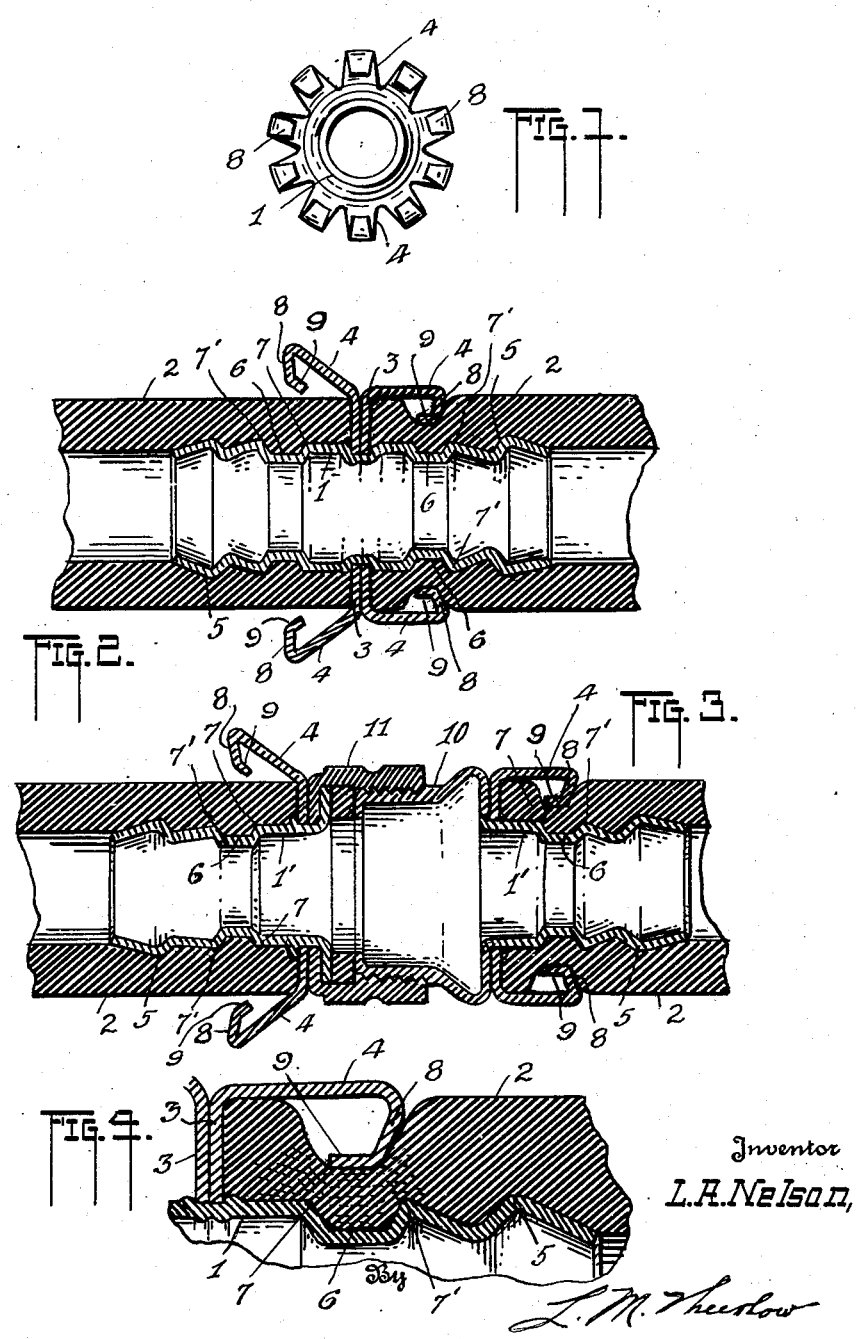

2,661,962

UNITED STATES PATENT OFFICE 2,661,962

HOSE CONNECTOR FOR PLASTIC PIPE

Lewen R. Nelson, Peoria, Ill.

Application January 11, 1950, Serial No. 137,983

1 Claim. (Cl. 285—77)

This invention relates to improvements in hose connectors, and in hose couplings. More particularly the invention pertains to a structure in a hose connector, or a hose coupling, by which to positively secure a hose of plastic material to either.

Specifically, the aim of the present invention is to construct an article of the nature stated by which a hose of plastic material can be firmly gripped to thereby provide a positive connection between the hose and the article in contrast to securing a rubber hose, which latter can be easily secured by any of the well known gripping arrangements.

A plastic material in order to have flexibility and to answer all purposes in a hose is necessarily of such nature as to creep, crawl and ooze around, away from and beneath and between the parts of the hose clamping means as commonly provided, this action occurring within itself and even when the hose is not subjected to strains during ordinary handling.

In view of the difficulty in controlling a plastic hose, therefore, a structure is herein shown which will be readily understood especially by reference to the appended drawing forming part hereof.

Fig. 1 is an elevation of part of any usual and well known hose connector, or a hose coupling, as viewed endwise, to illustrate the type of device under consideration.

Fig. 2 is a longitudinal section of a hose connector produced on a much larger scale than Fig. 1.

Fig. 3 is a longitudinal section of a hose coupling corresponding in scale to that in Fig. 2, and Fig. 4 is a detail of part of Fig. 2, for example, this having been produced on a much larger scale to best show the construction involved for securing a plastic hose-end.

The figures of the drawing illustrate certain parts which, in the main, are not unlike hose connectors, or hose couplings, in present use, but in the following description thereof the particular novel structure of the present invention will be disclosed.

In Fig. 2 the character 1 denotes a tubular shank which may receive thereover at each end a hose end 2, a pair of abutting ring-like members 3 being secured on the shank at its middle by expanding said shank at each side thereof as in common practice, the said rings each including a series of radial prongs or fingers 4. Each end of the shank 1 is enlarged at 5 to form a head over which a hose 2 is forced and made to abut a ring member as shown. As heretofore, the prongs or fingers 4 are to be forced down toward and upon the hose so that their terminals engage in the same.

Up to the present time the shanks of such devices are formed to provide an annular groove or peripheral depression into which the hose material is forced by pointed angular inwardly directed extensions of said fingers 4 as they appear in Fig. 1. Again, in common practice each of the side walls of the usual groove merges into the outer surface of the shank in a rounded annular corner or shoulder, the friction set up by such rounded corners having been found sufficient, in conjunction with the named angular extension of the fingers, to properly maintain a hose in fixed position when said hose is of firm rubber. In the present instance, by contrast, in providing the groove, denoted at 6, the machine elements, not shown, for producing the groove, are of such form as to provide sharp or abrupt annular shoulders identified as at 7 and 7' at the junctures of the side walls of the groove with the outer surface of the shank, this form of shoulder providing for a very definite and highly advantageous purpose as will appear.

Depending upon the particular type of plastic material employed these said sharp annular shoulders prevent the shifting or oozing of the material due to friction set up, even though the fingers 4 terminate in inwardly directed angular points already mentioned, and which directly engage in said hose.

It may be stated that, as with many materials for various purposes, uniform standards are not always met in the production thereof. In respect to plastic hose materials the same is true, besides which such materials may be purposely altered in nature to meet certain set specifications. A given material for a hose may answer in a hose connector wherein the sharp shoulders 7 and 7' are present and which cooperate with the inwardly directed extensions of the fingers of the connector. On the other hand where a different composition is used, which may be more prone to shift or ooze, another problem of securing the same may present itself. That such problem may be met, it is observed that the fingers 4 besides having the described inturned portions 8 of the drawing, said portions are each provided with a foot portion 9 extending toward the member 3 to engage and compress a hose on the shank. As best seen in Fig. 4, the hose engaging portion 9 substantially parallels the body portion of the finger 4. As seen in Figs. 2-4, the hose engaging portions 9 of the fingers 4 are somewhat shorter than the distance between the shoulders 7, 7' of the groove 6, and the length of each finger is such that the hose engaging portions 9 overhang the groove 6, that is, the portions 9 are approximately centered relative to the groove.

In forcing the fingers 4 upon the hose the foot portion 9 naturally swings in an arc into the hose material toward the member 3 and at the same time compresses said material beneath it forcing the same into the groove and upon the named sharp annular shoulders. The material is thus firmly imprisoned between the extensive lower surface of the foot portion and the groove-bottom, the sharp shoulders being particularly effective in holding said material, especially the corner 7'.

It is clear that the said foot portion at its heel where it joins the portion 8 compresses the hose firmly upon and over the shoulder 7', while its free extremity compresses the hose upon the shoulder 7. Thus the hose material is firmly and solidly packed into the groove. It has been thoroughly demonstrated that where a plastic hose is thus impounded and held in compressed condition the sharp shoulders are a bar to unseating of a plastic hose. As seen in Figs. 2–4, each foot or hose engaging portion 9 terminates at its free end, and at its juncture with the intermediate portion 8, in a sharp shoulder opposed to the sharp shoulders 7, 7', respectively, of the groove 6.

Initially, the enlarged head 5 at the extremity of the shank serves to control somewhat that part of the hose lying distant from the shoulders 7, 7' but the latter are indispensible in so far as complete control is concerned at the positions of the fingers 4.

The structure in Fig. 3 conforms to that of Fig. 2, in so far as results realized are concerned, said Fig. 3 showing a so-called hose coupling. The reference characters agree in both figures while the last named figure includes a male and female coupling portion 10 and 11, respectively.

It is clear that a plastic hose, much desired and required in the industries, calls for a special manner of its control due to the peculiarities thereof, and it is equally of note that the solution of the problem lies particularly in the sharp shoulders, assisted by the finger.

I claim:

In combination in a hose coupling of the class described, a shank having a peripheral groove including a flat axially extending bottom of substantial width; an annular member fixed to and extending outwardly from said shank; a plastic hose engaged over said shank with its end abutting said annular member; and a plurality of hose clamping fingers carried by said annular member, each of said fingers including a body portion extending substantially parallel to said shank along the outer surface of said hose, an intermediate portion of substantial length projecting from the end of said body portion toward said shank and thus into the body of said hose, and a flat hose-clamping portion embedded in said hose spaced from said body portion and extending from said intermediate portion back toward said annular member; each of said hose-clamping portions being substantially centered with respect to said groove, having a length substantially equal to the width of the flat bottom of said groove and lying substantially parallel to said flat bottom; said peripheral groove having flat sidewalls diverging outwardly, whereby the width of the mouth of said groove is greater than the length of said hose-clamping portions of said fingers, said sidewalls joining the outer surface of said shank in sharp annular shoulders; each of said hose-clamping portions of said fingers terminating in a sharp shoulder opposed to the sharp shoulder of said groove nearest said annular member, and the peripheral portion of said shank between said groove and said annular member presenting a plain cylindrical surface.

LEWEN R. NELSON.

References Cited in the file of this patent

UNITED STATES PATENTS

| Number | Name | Date |
|---|---|---|
| 1,051,621 | Nelson | Jan. 28, 1913 |
| 1,314,235 | Adkins | Aug. 26, 1919 |
| 1,965,426 | Nelson | July 3, 1934 |
| 2,562,116 | Nelson | July 24, 1951 |

FOREIGN PATENTS

| Number | Country | Date |
|---|---|---|
| 248,162 | Great Britain | Mar. 4, 1926 |